Feb. 27, 1923.  
G. LITTLEFORD.  
WOODWORKING MECHANISM.  
FILED AUG. 18, 1921.
1,446,851
3 SHEETS—SHEET 1.
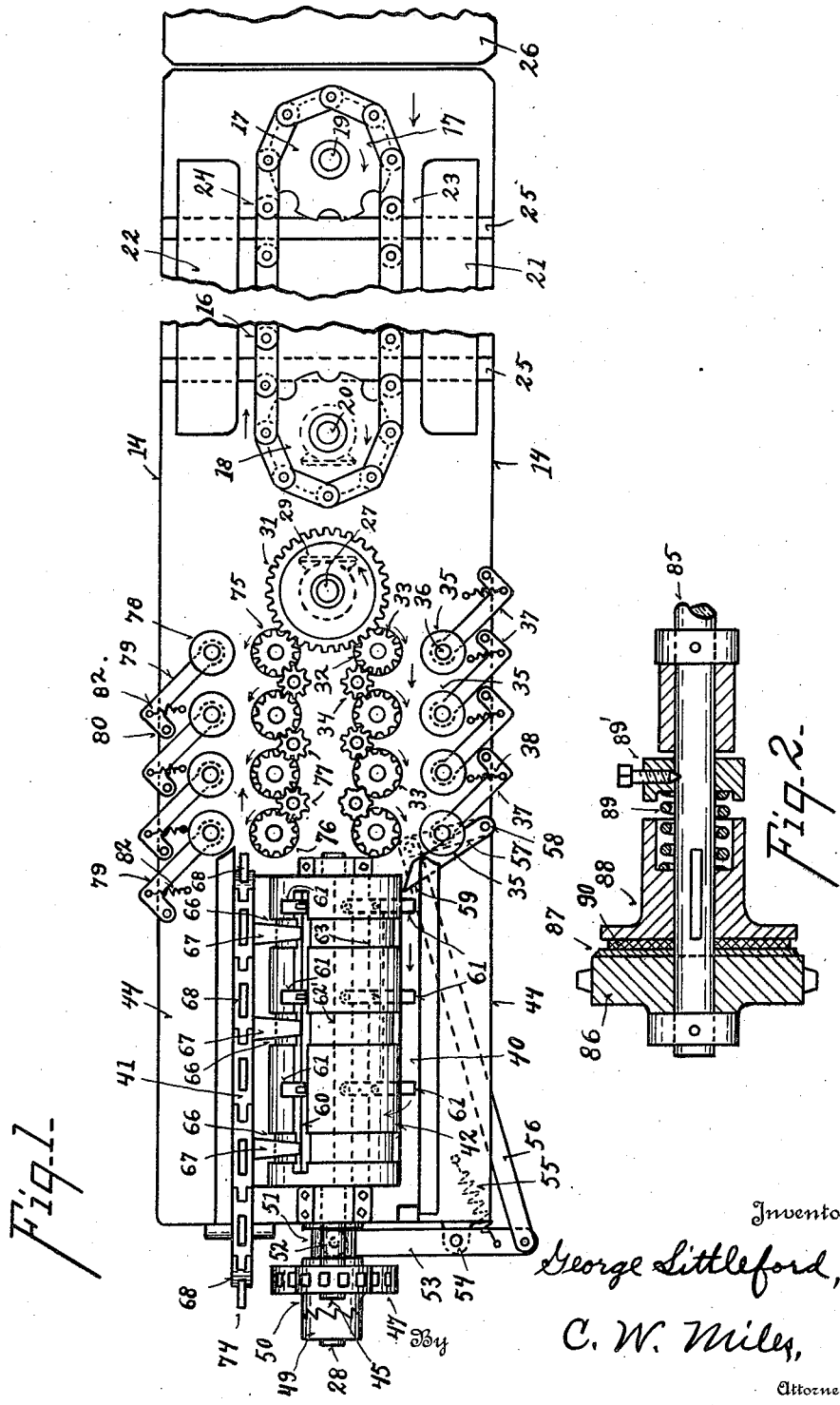

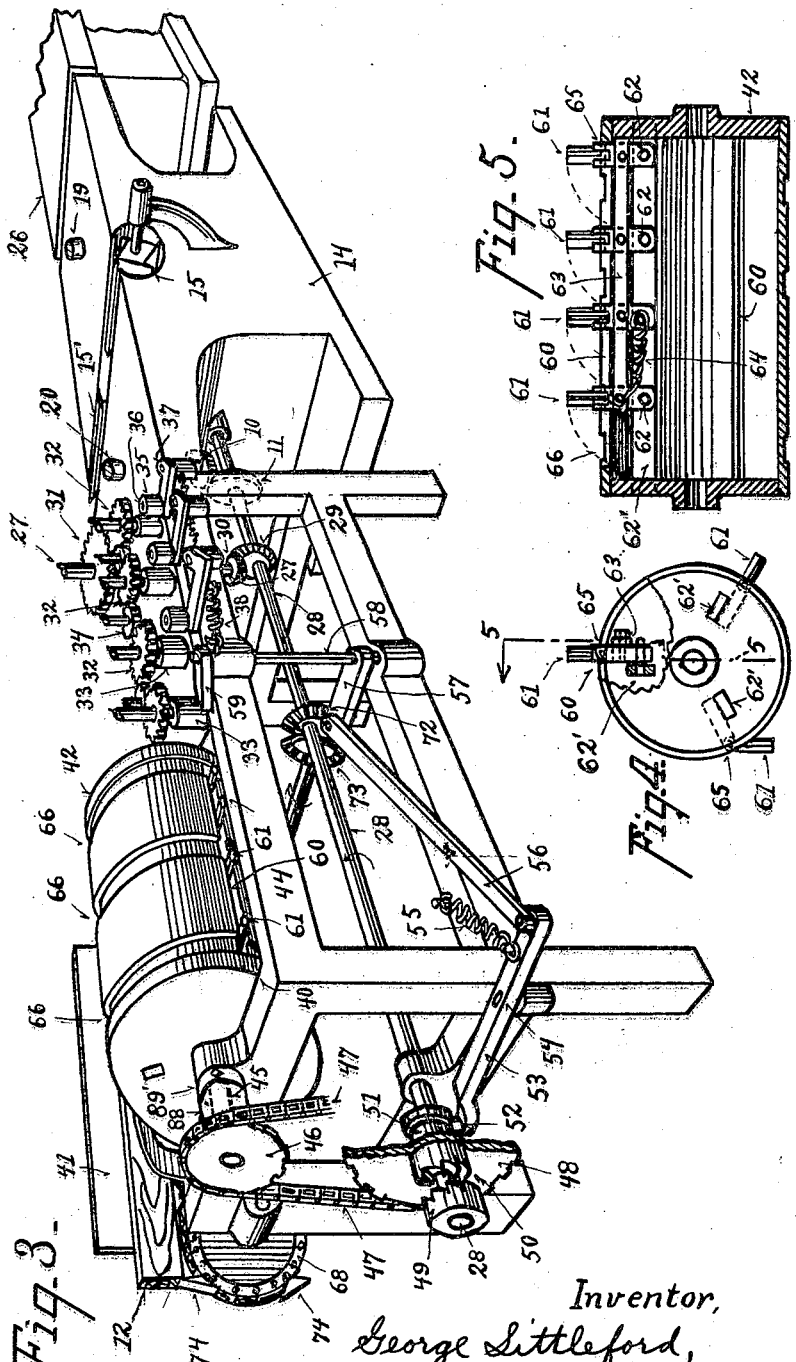

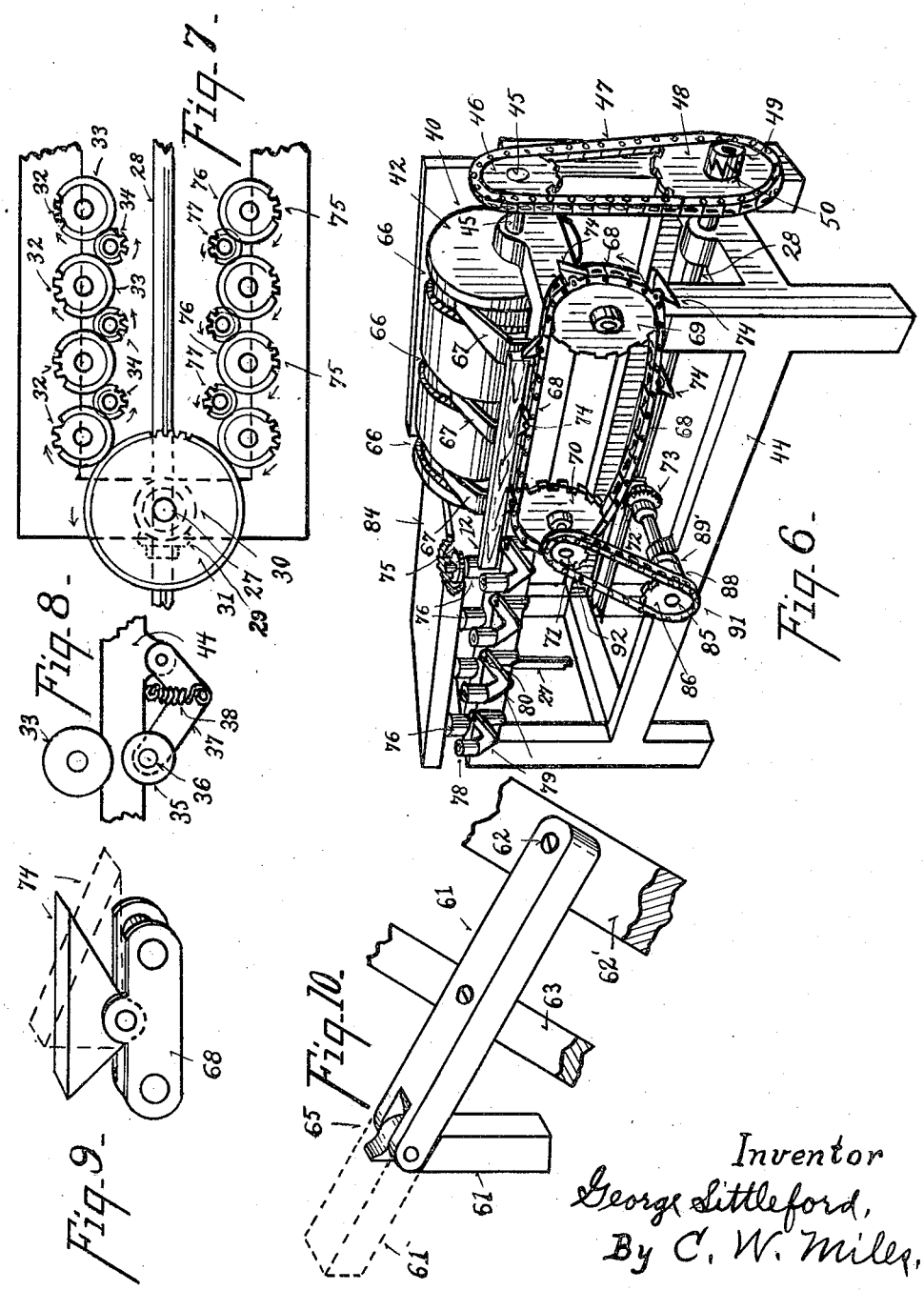

Patented Feb. 27, 1923.

1,446,851

UNITED STATES PATENT OFFICE.

GEORGE LITTLEFORD, OF FORT THOMAS, KENTUCKY.

WOODWORKING MECHANISM.

Application filed August 18, 1921. Serial No. 493,443.

*To all whom it may concern:*

Be it known that I, GEORGE LITTLEFORD, a citizen of the United States, residing at Fort Thomas, in the county of Campbell and State of Kentucky, have invented certain new and useful Improvements in Woodworking Mechanism, of which the following is a specification.

My invention relates to improvements in wood working mechanism. One of its objects is to provide for the automatic handling of a series of boards, strip of short stock pieces whereby the original boards are cut lengthwise into narrower strips which are successively fed forward to a jointer or matching machine where one edge is first fed over a cutter and surfaced and then the strips are successively turned over so as to present the opposite edge of the strips to be surfaced, and then by a feed again fed over a cutter to surface the opposite edge of the strip, thereby adapting the strips to be joined together in a glue press to provide boards of any desired width. Another object is to provide improved means to feed and reverse strips so as to present first one edge and then the other edge to the cutter. Another object is to provide an improved jointer having an automatic reversing feed whereby first one edge and then the opposite edge is presented to the cutter. Another object is to provide an improved jointer in which the stock is fed in at one end to surface one edge of the stock, and the stock is automatically reversed to present the opposite edge of the stock to the cutter and to feed the stock to the end of the jointer at which the stock entered. Another object is to provide improved intermittently actuated feed mechanism to reverse the position of the stock so as to present its opposite edge to the cutter. Another object is to provide improved means to receive and feed the reversed stock to the cutter. Another object is to provide improved feed clutch mechanism to intermittently and yieldingly effect the feed of the stock to avoid injury to the stock or to the mechanism. My invention also comprises certain details of form combination and arrangement, all of which will be fully set forth in the description of the accompanying drawings, in which:

Fig. 1 is a plan of my improved mechanism with portions of the housing and adjusting means omitted.

Fig. 2 is a sectional detail of one of the return feed driving shafts with a yielding clutch mechanism interposed to avoid injury to the stock or mechanism in the event of accident.

Fig. 3 is a perspective view of the main frame and reverse feed mechanism with portions of the housing and feeding mechanism omitted.

Fig. 4 is an end view of a drum employed to effect the reversing of the stock to present its opposite edge to the cutter.

Fig. 5 is a central vertical section taken on line 5—5 of Fig. 4.

Fig. 6 is a perspective view of the reverse feed mechanism from the opposite side.

Fig. 7 is a diagrammatic view of a gear train for a portion of the stock feed mechanism intermediate of the cutter and the reversing mechanism.

Fig. 8 is a plan of a pair of stock feeding rollers detached.

Fig. 9 is a perspective view of one of the links of the reverse stock feeding chain.

Fig. 10, is a detail perspective view of the series of drum feeding fingers detached.

The accompanying drawings illustrate the preferred embodiment of my invention in which 14 represents the frame of a jointer on which are mounted rotary cutters 15 and 15' designed to true up and surface the edges of the stock so that the stock members 12 may be glued together edge to edge. In order to feed the stock to the cutters I preferably employ an endless feed belt or chain 16 mounted upon sprocket wheels 17 and 18. The wheels 17 and 18 are mounted upon vertical shafts 19 and 20, one of which is preferably driven from the same counter-shaft as the cutters 15 and 15' at a relatively slower speed. The shafts 19 and 20 and feed-chain may be independently driven if desired.

In order to hold the stock in contact with the feed-chain, platens 21 and 22 are provided on opposite sides of the feed chain to form channels 23 and 24 between the platens and feed chain for the passage of the stock. The platens 21 and 22 are preferably adjustably mounted upon guides 25 on the frame 14 by means of any suitable adjusting means, not shown, whereby the width of the channels 23 and 24 may be adjusted to the thickness of the stock and to hold the stock sufficiently in contact with the face of the feed-chain so that the stock will be fed along with the feed-chain.

In advance of the jointer frame 14 I preferably provide a saw table 26, substantially such as shown in Letters Patent of the United States No. 1,229,987, granted me June 12, 1917, and which is so arranged as to automatically feed strips of stock of substantially uniform width and thickness into position to be engaged by the feed-chain 16 and fed forward thereby.

At the opposite end of the jointer frame 14 from the saw table 26 is a vertical shaft 27 driven from a horizontal shaft 28 by means of miter gears 29 and 30. The shaft 28 is driven from shaft 20 through miter gears 10 and 11. The shaft 27 at its upper end is provided with a spur gear 31 which meshes with and drives two independent trains of gears. One of said trains of gears comprises a series of gears 32 mounted upon the shafts of a series of stock feeding rollers 33, and a series of idler gears 34. A series of rollers 35 are journaled loosely upon stud shafts 36 carried by the pivotally mounted levers 37 which are actuated by springs 38 to cause the rollers 35 to yieldingly engage the stock members to hold the stock members in engagement with the face of the positively driven feed rollers 33 to feed the stock members away from the feed-chain and to the reversing mechanism.

The reversing mechanism comprises a receiving channel 40 into which the stock members are successively fed after having one edge surfaced, a channel 41 to receive the reversed stock members successively, a feeding drum 42 to transfer the stock members successively from the receiving channel 40 to the channel 41 with their opposite edge up and a feed-chain 68 to feed the stock members successively out of the channel 41 toward the jointer to have the opposite edge of the stock members surfaced.

The reversing drum 42 is rotatably mounted upon a shaft 45 journaled to frame 44, which frame may be independent of or integral with the frame 14. A sprocket wheel 46 on the shaft 45 is driven by a sprocket chain 47 from a sprocket wheel 48 which is loosely journaled upon the shaft 28. A clutch member 49 is rigidly mounted upon the shaft 28 in position to be engaged by a clutch member 50 on the hub of the sprocket wheel 48. The hub of the sprocket wheel 48 is also provided with an annular groove 51 engaged by a roller 52 carried at the end of a lever 53 pivoted at 54 to the frame 44, to shift the wheel 48 endwise on the shaft 28 to engage and disengage the clutch members 49 and 50. A spring 55 normally holds the clutch members 49 and 50 in engagement. A link 56 connects the lever 53 to a crank arm 57 carried by a vertical shaft 58 which has a crank arm or finger 59 projecting into the channel 40 to be engaged by the successive stock members as they enter the channel 40 to rock the shaft 58 and thereby disengage the clutch members 49 and 50 and stop the feed of the drum 42 until after the rear end of the stock member has passed the free end of the crank arm 59, whereupon the clutch members 49 and 50 engage to feed the drum 42 forward.

The drum 42 is provided with a plurality of slots 60 longitudinally thereof and a series of fingers 61 pivotally connected at 62 to bars 62' and projecting through the slots 60. Said fingers are preferably each connected pivotally to a connecting bar 63, so as to all move upon their pivots 62 in unison. A spring 64 serves to yieldingly hold each series of fingers 61 in the extended position shown in Fig. 5, and to permit said fingers to move upon their pivots 62 as indicated in Fig. 5 out of the path of any stock member entering the channel 40, should said fingers be in position to be engaged by a stock member at the time it enters the channel 40. The fingers 61 are also preferably composed of two sections jointed or hinged at 65 so that the outer ends may automatically tip downwardly as indicated at the lower left hand portion of Fig. 4, to get the outer ends of said fingers out of the way of and free to pass the stock member when the stock member enters the channel 41.

The face of the drum 42 is provided with a plurality of annular channels 66 into which enter flexible sheet metal fingers 67 to receive the successive stock members from the drum 42 and to guide the stock members into the channel 41. At the bottom of the channel 41 is a feed chain 68 supported upon the two sprocket wheels 69 and 70.

The wheel 70 is mounted upon a shaft 71 which is driven indirectly by a pair of miter gears 72 and 73 from the shaft 28. The sprocket chain 68 has pivotally connected thereto a series of irregular triangular blocks or feeding fingers 74, which normally occupy a position in the feeding channel 41 with one corner projecting upwardly to engage the end of the stock member to feed the stock member along and out of the channel 41. When however a stock member is discharged by the drum 42 into the channel 41 it alights upon a series of the fingers 74 see Fig. 6 and its weight tips the projecting ends of said fingers downwardly so that the stock member rests upon the horizontal outer faces of a series of said fingers, and the next finger with its projecting end engages the end of the stock member to feed the stock member forward out of the channel 41.

As the respective stock members pass out of the channel 41 they enter between the positively driven feed rollers 75 driven by the train of gears 76 and 77 from the gear 31, and the yieldingly mounted rollers 78 loosely mounted upon the arms 79 which are pivoted at 80 to the frame 44 and yieldingly actuated by springs 82 to hold the rollers 78 yieldingly in engagement with the stock members and the stock members in yielding engagement with the positively driven feed rollers 75 to feed the stock from the channel 41 and into engagement with the feed chain 16, which serves to feed the stock members successively along the channel 24 and over the cutter 15 to surface the opposite edge of the successive stock members.

The gear 31 and gears 32, 34, 76, and 77 are preferably inclosed in a housing 84. In order to avoid liability of injury to the stock or to the mechanism in the event of one or more of the stock members not properly entering the feed channel 41, or other similar cause, I preferably provide a yielding friction clutch interposed between the positively driven shaft 85 driven by the miter gears 72 and 73 from shaft 28, and the sprocket wheel 86 mounted loosely upon said shaft 85, and comprising a frictional disk or clutch member 87 carried by the sprocket wheel 86 a similar frictional disk 90 carried by a hub 88 splined to the shaft 86, and a spring 89 and collar 89' to yieldingly hold said frictional disks in driving engagement. In the event of any unusual strain upon the feed mechanism the clutch members 87, and 90 will yield and slip and the feed of the chain 68 will stop until the obstruction is removed. A chain 91 driven by the wheel 86 drives the sprocket wheel 92 and wheel 70 both mounted upon the shaft 71 which is journaled to the frame 44. I also preferably interpose yielding driving means such as shown in Fig. 2 between the wheel 46 and drum 42.

In operation the stock members are fed either automatically or by hand endwise and on edge into the channel 23 through which they are carried by the feed chain 16 and delivered to the feed rollers 33 and 35. The rollers 33 are speeded to feed faster than the chain 16, and as soon as a stock member is released by the chain 16 the rollers 33 and 35 carry it quickly away and deliver it into the channel 40. Each stock member as it engages the crank arm 59 releases the clutch members 49 and 50 to stop the feed of the drum 42 until the rear end of the stock member has passed the arm 59 whereupon the drum 42 feeds forward causing the stock member to be picked up from the channel 40 upon one set of the fingers 61 and carried with the drum until the stock member passes over the center of the drum at the top and slides down the opposite side of the drum upon the fingers 67 and is guided by them into the feeding channel 41 resting upon the blocks 74 of the feed chain 68 which carries the stock member forward into engagement with the feed rollers 75 and 78 which in turn feed the stock member into engagement with the face of the feed chain 16 to feed the stock through the feed channel 24 from which the stock members make their exit successively with both edges surfaced ready to be matched together in a glue press. In the event that the drum 42 should be stopped with one set of the fingers 61 projecting into the feed channel 40, the advance of a stock member into said channel will push the fingers 61, turning upon their centers 62, out of the path of the stock member so that when the drum commenced its forward feed the next set of fingers would serve to pick up the stock member. On the discharge side of the drum 42 the projecting portion of the fingers automatically drop out of position to be engaged by a stock member resting in the channel 41. If desired the stock members may have their edges tongue-and-grooved.

The mechanism herein illustrated and described is capable of considerable modification without departing from the principle of my invention.

What I claim is:

1. A machine comprising a feeding table provided with forward and reverse stock feeding channels and one or more rotary cutters to surface the stock, means to feed the stock members successively in the forward direction in one feeding channel and in the reverse direction in the opposite feeding channel, an intermittently driven drum provided with fingers to successively pick up the stock members from one feed channel and to deposit the stock members reversed in position in the opposite feed channel, a clutch to intermittently connect said drum in driving relation, and a clutch actuating member in position to be engaged by the successive stock members to actuate said clutch and stop the feed of said drum until the respective stock members have reached a predetermined position with reference to said drum.

2. A surfacing machine comprising a feeding table provided with forward and reverse stock feeding channels and one or more rotary cutters to surface the stock, means to feed the stock members successively in the forward direction in one feeding channel and in the reverse direction in the opposite feeding channel, an intermittently driven drum provided with fingers to successively pick up the stock members from one feed channel and to deposit the stock members reversed in position in the opposite feed channel, a clutch to intermittently connect said drum in driving relation, a clutch actuating member in position to be engaged by the successive stock members to actuate said clutch and stop the feed of said drum until the respective stock members have reached a predetermined position with reference to said drum, said fingers being pivotally and yieldingly mounted upon and relatively to said drum to adapt said fingers to move out of the path of the stock members when engaged sidewise by said stock members.

3. A surfacing machine comprising a feeding table provided with forward and reverse stock feeding channels and one or more rotary cutters to surface the stock, means to feed the stock members successively in the forward direction in one feeding channel and in the reverse direction in the opposite feeding channel, and a feeding drum provided with pivotally and yieldingly mounted fingers to reverse the position of said stock members and to feed the stock members from one of said feeding channels to the other.

4. A surfacing machine comprising a feeding table provided with forward and reverse stock feeding channels and one or more rotary cutters to surface the stock, means to feed the stock members successively in the forward direction in one feeding channel and in the reverse direction in the opposite feeding channel, a yieldingly propelled reverse stock feeding means in said reverse feed channel to receive the stock members and to initiate the reverse feed thereof, and a feeding member provided with pivotally and yieldingly mounted fingers to reverse the position of the stock members and to feed the stock members from one of said feeding channels to the other.

5. A surfacing machine comprising a feeding table provided with forward and reverse stock feeding channels and one or more cutters to surface the stock, means to feed the stock members successively in forward direction in one feeding channel and in the reverse direction in the opposite feeding channel and an intermittently actuated feeding member provided with yieldingly mounted fingers to reverse the position of said stock members and to feed the stock members from one of said feeding channels to the other.

6. A surfacing machine comprising a feeding table provided with forward and reverse stock feeding channels and one or more cutters to surface the stock, an intermittently actuated feeding member provided with yieldingly mounted fingers to reverse the position of said stock members and to feed the stock members from one of said feeding channels to the other, and means actuated by the movement of stock members in said forward stock feeding channel to control the intermittent movement of said intermittently actuated feeding member.

7. A jointer comprising a feed table provided with means to automatically feed stock members along separate feed channels in forward direction and in reverse direction, means to surface one face of said stock members at the forward feed thereof and to surface the opposite face thereof at the reverse feed of the stock members a traveling feeding member provided with yieldingly mounted fingers to reverse the position of the stock members and to feed the stock members from one of said feeding channels to the other and a feeding chain provided with fingers normally in position to engage the ends of the stock sections to feed the stock sections forward, and which fingers are adapted to be shifted into inoperative position by the weight of the stock sections resting thereon.

8. A jointer comprising a feed table provided with means to automatically feed stock members along separate feed channels in forward direction and in reverse direction, means to surface one face of said stock members at the forward feed thereof and to surface the opposite face thereof at the reverse feed of the stock members, an intermittently driven feeding member provided with fingers to lift the stock members successively from the forward feed channel and to reverse the position of the stock members and deposit the stock members successively in the reverse feed channel, and a feed chain in said reverse feed channel to receive the stock members from said feeding member and to initiate the reverse feed of said reversed stock members.

9. A surfacing machine comprising a feeding table provided with forward and reverse stock feeding channels and one or more rotary cutters to surface the stock, a series of stationarily mounted and positively driven off-take feed rolls and a series of yieldingly mounted idler feed rolls to feed the stock sections away from said cutter in said forward feed channel, an intermittently driven feeding member provided with fingers to successively pick up the stock members from said forward feed channel and to deposit the stock members reversed successively in the reverse feed channel, a clutch to intermittently connect said feeding member in driving relation, and a clutch actuating member in position to be engaged by the successive stock members in their passage away from the cutter in said forward feed channel to actuate said clutch and stop the feed of said feeding member until the respective stock members have each reached a predetermined position with reference to said feeding member.

In testimony whereof I have affixed my signature.

GEORGE LITTLEFORD.